US007812496B2

(12) United States Patent
Sugiura et al.

(10) Patent No.: US 7,812,496 B2
(45) Date of Patent: Oct. 12, 2010

(54) CASSETTE COIL AND ROTATING ELECTRICAL MACHINE HAVING THE CASSETTE COIL

(75) Inventors: Hiroharu Sugiura, Toyota (JP); Norihiko Akao, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 120 days.

(21) Appl. No.: 12/083,205

(22) PCT Filed: Oct. 19, 2006

(86) PCT No.: PCT/JP2006/321315

§ 371 (c)(1),
(2), (4) Date: Apr. 7, 2008

(87) PCT Pub. No.: WO2007/063659

PCT Pub. Date: Jun. 7, 2007

(65) Prior Publication Data

US 2009/0230810 A1 Sep. 17, 2009

(30) Foreign Application Priority Data

Nov. 30, 2005 (JP) ............................ 2005-344897

(51) Int. Cl.
*H01F 5/02* (2006.01)
*H02K 3/34* (2006.01)

(52) U.S. Cl. .................... 310/194; 310/254.1; 310/208; 310/215

(58) Field of Classification Search ................. 310/259, 310/194, 208, 215, 254.1; 336/192
See application file for complete search history.

(56) References Cited

U.S. PATENT DOCUMENTS 3,219,856 A * 11/1965 Dunwiddie et al. ....... 310/68 R
3,691,425 A * 9/1972 Weyrich et al. ............... 361/41
4,112,405 A * 9/1978 Joseph .......................... 337/4
7,126,246 B2 * 10/2006 Izumi et al. ................. 310/208
7,569,964 B2 * 8/2009 Ijima .......................... 310/194
2002/0163275 A1 * 11/2002 Hsu ........................... 310/194

FOREIGN PATENT DOCUMENTS

DE 33 20 530 A1 12/1984
JP 55 118614 9/1980
JP 06-005353 1/1994
JP 09-215245 8/1997
JP 11-122855 4/1999
JP 2002-171704 6/2002
JP 2002-289389 10/2002

* cited by examiner

*Primary Examiner*—Quyen Leung
*Assistant Examiner*—Terrance Kenerly
(74) *Attorney, Agent, or Firm*—Kenyon & Kenyon LLP

(57) ABSTRACT

A cassette coil comprising an insulator bobbin including a core tube around which a wire coated with an insulating film is wound, forming a coil, and a pair of plate-shaped flanges provided at both ends of the core tube, the flange including a cutout portion opening in a side, wherein the cassette coil includes an insulation wall between a winding start part which is one end of the coil of the wire and an outermost wire part located on the outermost side of the coil of the wire and close to the flange.

6 Claims, 11 Drawing Sheets

CASSETTE COIL AND ROTATING ELECTRICAL MACHINE HAVING THE CASSETTE COIL

This is a 371 national phase application of PCT/JP2006/321315 filed 19 Oct. 2006, claiming priority to Japanese Patent Application No. 2005-344897 filed 30 Nov. 2005, the contents of which are incorporated herein by reference.

TECHNICAL FIELD

The present invention relates to a cassette coil to be mounted in a stator of a rotating electrical machine and a rotating electrical machine using such a cassette coil. More particularly, the invention relates to a cassette coil having an insulation member which insulates between a winding start part of the wire and an outermost part of the coil around an insulator bobbin comprising a cassette coil, and a rotating electrical machine using the cassette coil.

BACKGROUND ART

FIG. 12 illustrates a perspective view of a coil bobbin 101 disclosed in Japanese Unexamined Patent Publication No. 11 (1999)-122855 as the first prior art. The coil bobbin 101 comprises a core tube 114 around which wires are wound to form a coil and flanges 115 provided on both axial ends of the core tube 114. The coil is formed by concentrated winding around the coil bobbin 101 and then attached to a stator (not shown).

As the second known art, a cassette coil 201 is shown in FIGS. 13 and 14. FIG. 13 illustrates a front view of the cassette coil 201. FIG. 14 illustrates a view of the cassette coil 201 seen from the back of a flange 215, the view from which a flange 216 to be described later is excluded for convenience of explanation. As shown in FIGS. 13 and 14, the cassette coil 201 is provided with an insulator bobbin 210 for forming the coil. The insulator bobbin 210 has a core tube 214, around which wires 213 are wound to form a coil, and a pair of plate-shaped flanges 215 and 216 provided at both axial ends of the core tube 214. Further, the flange 215 at one end of the core tube 214 is formed with a cutout portion 212. FIGS. 13 and 14 illustrates the coil, which is formed from the insulator bobbin 210, around which, the wire 213 is wound.

DISCLOSURE OF INVENTION

Problems to be Solved by the Invention

However, there is a following problem in the cassette coil 201 of the second prior art. At the outset of the discussion, a process for forming the coil by winding the wires 213 around the insulator bobbin 210 will be explained. First, the wires 213 are inserted from an opening side of a cutout portion 212. Next, the wires 213 are gradually shifted from the flange 215 side to the flange 216 side, so that the first layer of wires 213 is formed around the core tube 214. In winding, the wires 213 are wound around in unit of two wires. Next, the wires 213 are shifted back from the flange 216 side to the flange 215 side, so that the second layer of the wires 213 is formed on the first layer around the core tube 214. Next, the wires 213 are shifted from the flange 215 side to the flange 216 side again, so that the third layer of the wires 213 is formed around the core tube 214. In this way, the coil having a predetermined number of layers of the wires 213 wound around the core tube 214 is formed, then at the uppermost layer which is an outer periphery of the coil, the wires 213 are shifted from the flange 216 side to the flange 215 side and finally guided and engaged from the wound part into a stopper groove 218. As explained above, the wires 213 are wound around the core tube 214, forming the coil.

In forming the coil by winding the wires 213 around the core tube 214 of the insulator bobbin 210 as shown in FIGS. 13 and 14, a coil starting position of the wires 213 is referred to as a winding start part 213*a*. In the wires 213, a coil part in an outer periphery is referred to as an outermost part 213*b*. The part in an ending position extending from the outermost part 213*b* to be inserted into the stopper groove 218 is referred to as a winding end part 213*c*.

In the cassette coil 201 of the second prior art, as shown in FIGS. 13 and 14, since the winding start part 213*a* of the wires 213 is adjacent to the outermost part 213*b*, they might be in contact with each other. Not specifically described in Japanese Unexamined Patent Publication No. 11 (1999)-122855, it is likely that, in the coil bobbin 101 disclosed therein, in forming the coil by winding the wires around, the winding starting part of the wires and the outermost part of the coil are in contact with each other because they are adjacent.

A schematic view of a typical coil is shown in FIG. 9. A positional relationship of the winding start part 213*a*, the outermost part 213*b*, and the winding end part 213*c*, each of which is defined in the above explanation of the cassette coil 201 of the second prior art, is illustrated in FIG. 9 when applied to a typical coil. In the typical coil, a potential difference between any two points in the coil when a current is applied becomes larger as the distance between the two points becomes longer. In FIG. 9, the potential difference is the largest between both ends of the coil, A and B.

Particularly in the cassette coil 201 of the second prior art, since the distance between the winding start part 213*a* and the outermost part 213*b* is longer, the potential difference therebetween becomes larger when a high current is passed through the coil to apply a high voltage. Although each wire 213 is coated with an insulating film such as enamel, its thickness is about 30 μm. While miniaturization of motors for automobiles are being required these days, there is a trend to apply a high voltage (for example, about 650 V) to a motor in order to produce higher output. It is thus important to properly insulate between the winding start part 213*a* and the outermost part 213*b*. Contact between the winding start part 213*a* and the outermost part 213*b* can sometimes make it difficult to ensure insulation to result in a dielectric breakdown. Although 100% inspection eliminates the possibility of products with such defect as above, the defect causes a problem of cost increase.

The object of the invention is therefore to provide a cassette coil that can properly insulate between a winding start part of a wire and an outer periphery of a coil even when a high voltage is applied, and a rotating electrical machine using such a cassette coil.

Means for Solving the Problems (1) In order to achieve the above object, according to one aspect of the invention, there is provided a cassette coil comprising an insulator bobbin including a core tube around which a wire coated with an insulating film is wound, forming a coil, and a pair of plate-shaped first and second flanges provided at both ends of the core tube, the first flange including a cutout portion opening in a side, wherein the cassette coil includes an insulation member between a winding start part which is one end of the coil of the wire and an outermost wire part located on the outermost side of the coil of the wire and close to the first flange.

Electric insulation is thus secured owing to the insulation member as well as to the insulating film covering the wires. Therefore, insulation is secured properly between the winding start part of the wires and the outermost part of the coil, where a potential difference becomes the largest when a current is applied to the coil, to prevent a dielectric breakdown.

(2) In the cassette coil described in the above (1), preferably, the insulation member is an insulating wall provided to extend from a part of the first flange.

Since the insulating wall is provided for the insulator bobbin beforehand, insulation is thus secured between the winding start part of the wires and the outermost part of the coil by merely winding the wires to form the coil. Therefore, in addition to the effect attained from the device of (1), a workload for producing cassette coils is reduced, so that productivity is increased. Further, since the device of (1) needs merely a shape change of a bobbin and does not need an additional member to be attached, weight increase of a cassette coil can be suppressed.

(3) Alternatively in the cassette coil described in the above (1), preferably, the insulation member is an insulating tube covering the winding start part of the wire.

Insulation is thus secured owing to the lightweight insulation tube covering the winding start part of the wires. Therefore, in addition to the effect attained from the device of (1), weight increase of a cassette coil can be suppressed.

(4) According to the other aspect of the invention, there is provided a rotating electrical machine provided with a cassette coil comprising an insulator bobbin including a core tube around which a wire coated with an insulating film is wound, forming a coil, and a pair of plate-shaped first and second flanges provided at both ends of the core tube, the first flange including a cutout portion opening in a side, wherein the rotating electrical machine includes one of the cassette coils set forth in the above (1) to (3).

Electric insulation is thus secured owing to the insulation member as well as to the insulating film covering the wires. Therefore, insulation is secured properly between the winding start part of the wires and the outermost part of the coil, where a potential difference becomes the largest when a current is applied to the coil, to prevent a dielectric breakdown.

In addition, since the insulating wall is provided for the insulator bobbin beforehand, insulation is secured between the winding start part of the wires and the outermost part of the coil by merely winding the wires to form the coil. Since the above device needs merely a shape change of a bobbin and does not need an additional member to be attached, weight increase of a cassette coil can be suppressed. Therefore, a workload for producing cassette coils is reduced, so that productivity is increased.

Further, insulation is secured owing to the lightweight insulation tube covering the winding start part of the wire with. Therefore, weight increase of a cassette coil can be suppressed.

BEST MODE FOR CARRYING OUT THE INVENTION

Embodiments of the present invention will be given as below.

First Embodiment

Figure 1:
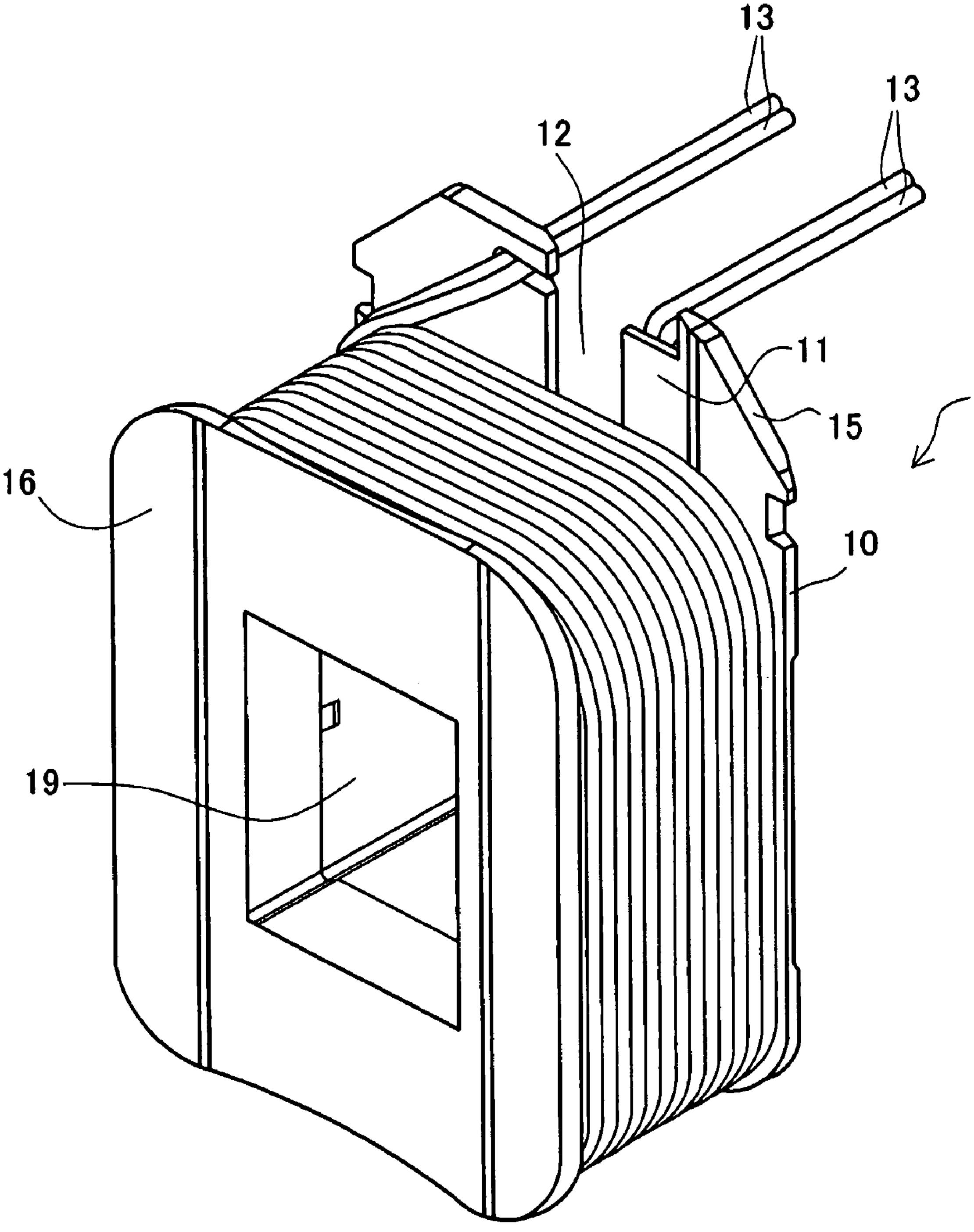
FIG. 1 is an external perspective view of a cassette coil of the invention.
Figure 2:
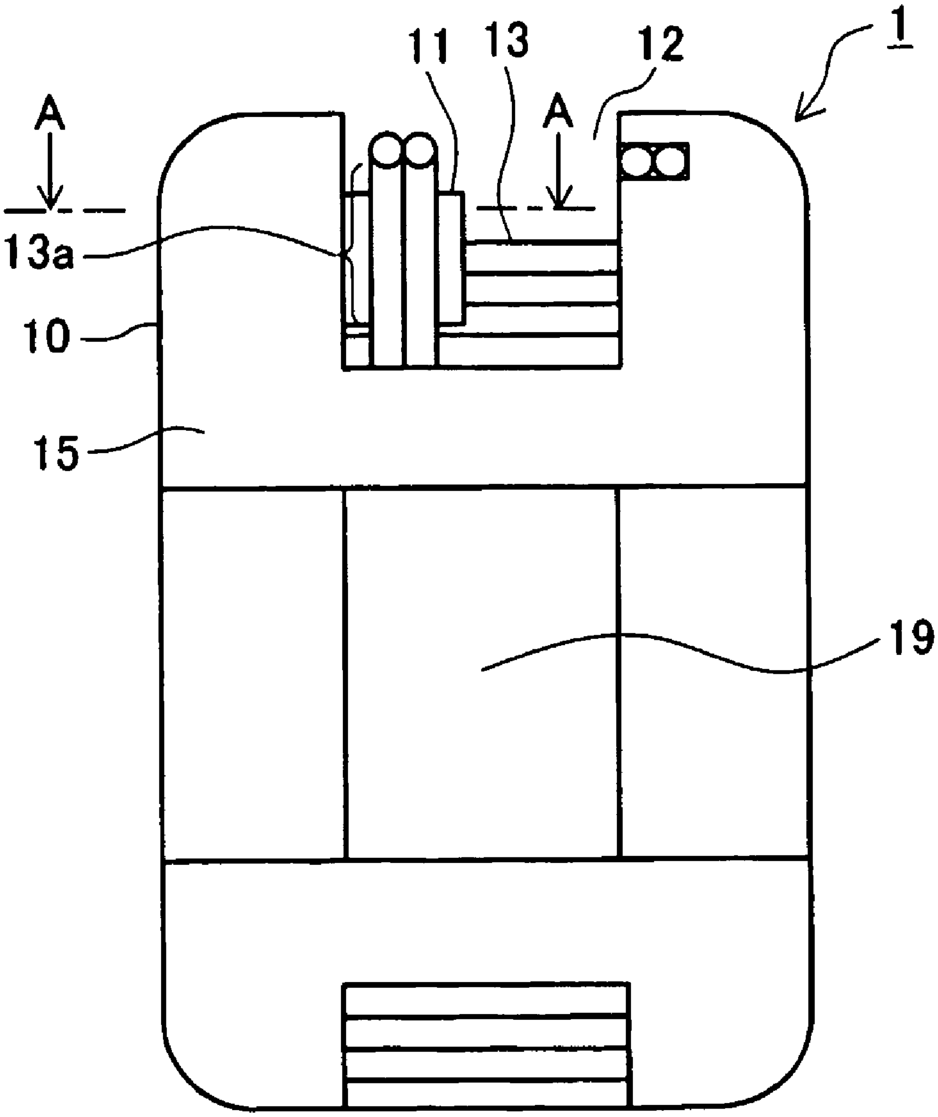
FIG. 2 is a front view of the cassette coil of the invention.
Figure 3:
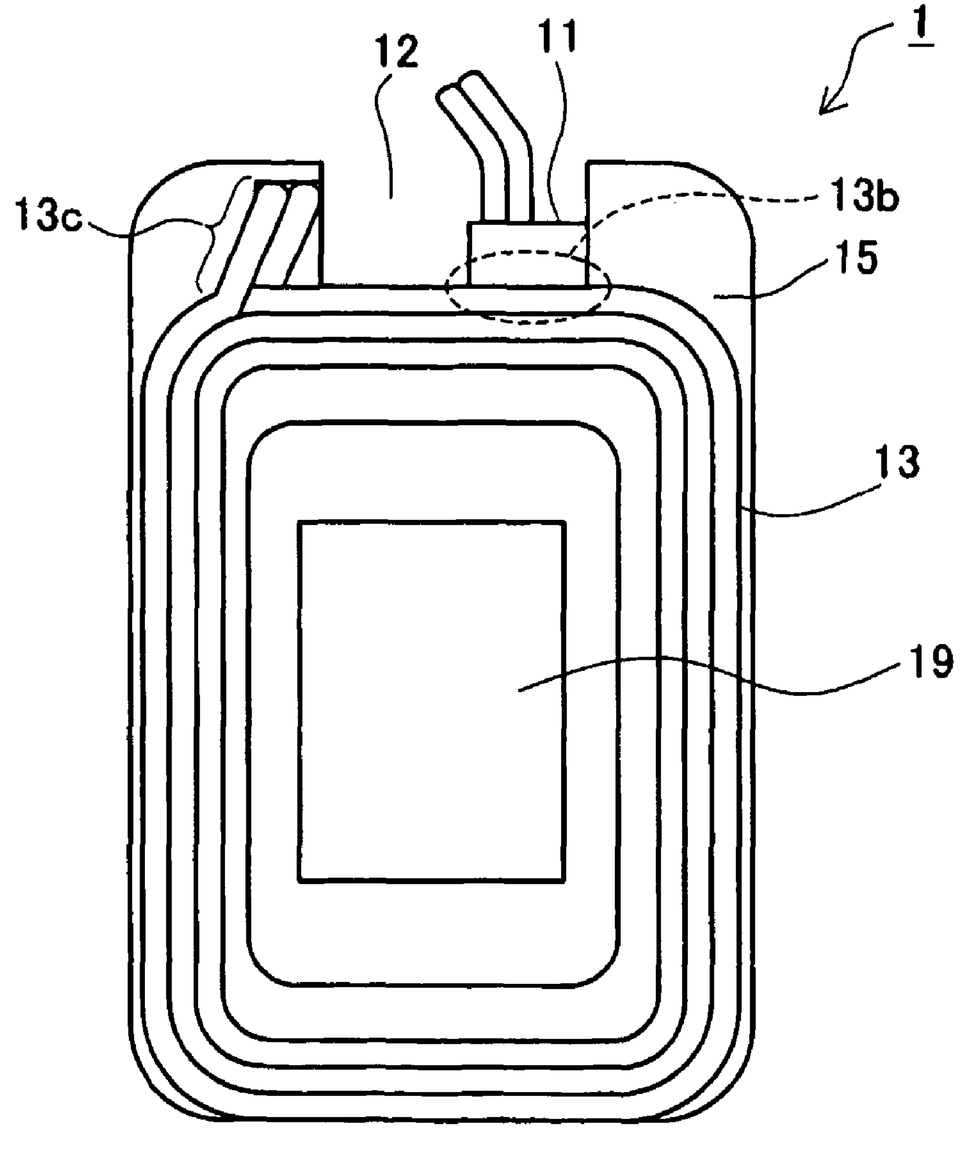
FIG. 3 is a view of FIG. 2 seen from the backside of a flange.

A first embodiment will be set forth. FIG. 1 is an external perspective view of a cassette coil of the first embodiment. FIG. 2 is a front view of the cassette coil 1 of the first embodiment. FIG. 3 is a view of the cassette coil 1 seen from the backside of a flange 15, the view from which a flange 16 to be described later is excluded for convenience of explanation. As shown in FIGS. 1 to 3, the cassette coil 1 includes a coil formed by winding a plurality layers of wires 13 wound in layers around an insulator bobbin 10. A plurality of the cassette coils 1 will be arranged in a stator to produce a motor.

Figure 4:
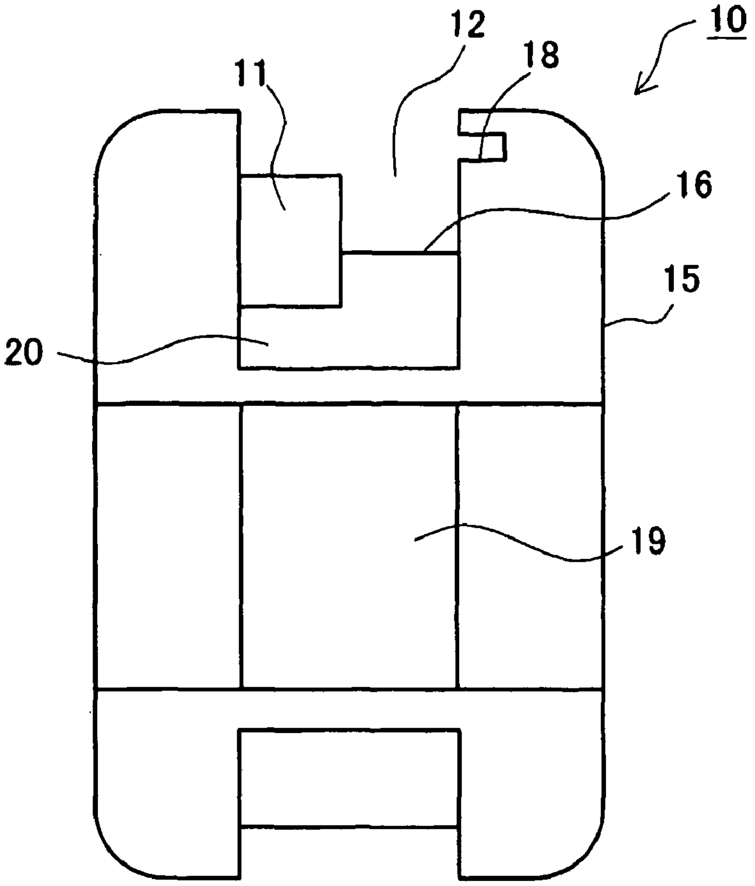
FIG. 4 is a front view of an insulator bobbin.
Figure 5:
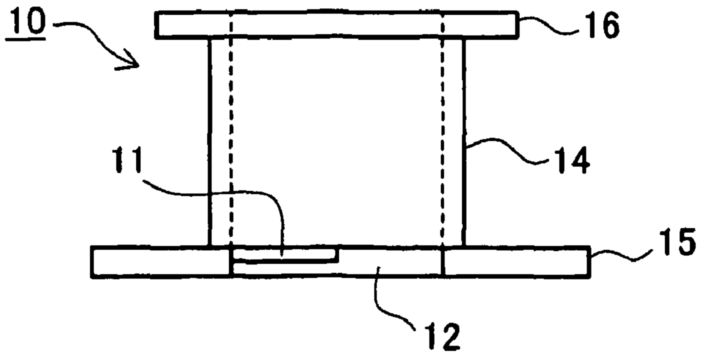
FIG. 5 is a top view of the insulator bobbin.
Figure 6:
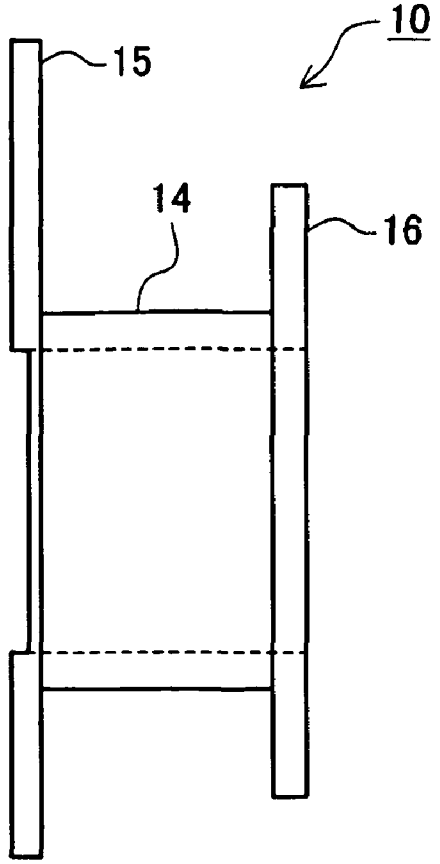
FIG. 6 is a side view of the insulator bobbin.

FIGS. 4, 5, and 6 are respectively a front view, a top view, and a side view of the insulator bobbin 10. As shown in FIGS. 4 to 6, the insulator bobbin 10 is composed of a core tube 14 of a rectangular cross section including a center hole 19 which is a cavity area, a pair of plate-shaped flanges 15 and 16 formed at both axial ends of the core tube 14, etc. The insulator bobbin 10 is made of resin such as PPS (polyphenylene sulfide) to have an insulating property. The flange 15 has a distinctive shape as compared with the flange 16 provided with a nearly normal rectangular shape. Specifically, the flange 15 includes an insulating wall 11, a cutout portion 12, a stopper groove 18, the center hole 19, a clearance 20, etc.

The flange 15 is made of resin such as PPS (polyphenylene sulfide) to have an insulating property. As shown in FIG. 4, the cutout portion 12 is a rectangular area cut out from the flange 15 so as to open at the upper side. The insulating wall 11 is provided to extend from one of the vertical surfaces (a left surface in FIG. 4) of the cutout portion 12 into the cutout portion 12. A clearance 20 is provided between the insulating wall 11 and the lower surface of the cutout portion 12.

Figure 7:
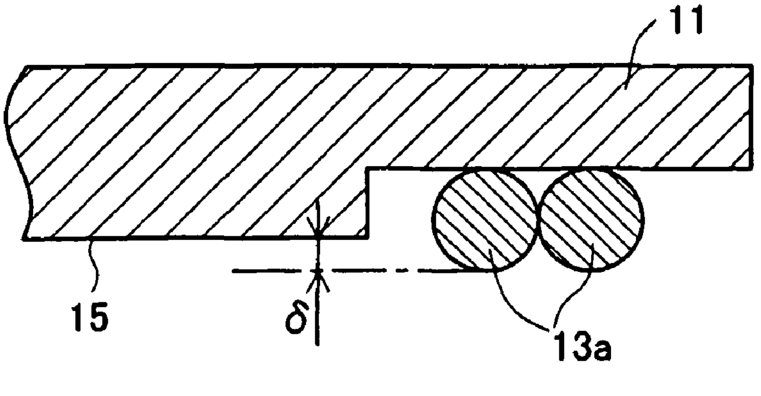
FIG. 7 is a cross-sectional view of FIG. 2 taken along the line A-A.

FIG. 7 is a cross-sectional view of FIG. 2 taken along the line A-A. As shown in FIG. 7, the thickness of the insulating wall 11 is formed as small as possible in a manner that it ensures electric insulation and smaller than that of the insulator bobbin 10. Further, the insulating wall 11 is arranged so that its inside surface is flush with the inside surface of the flange 15 (i.e., on the flange 16 side). A winding start part 13*a* of the wires 13 is placed against the insulating wall 11. Accordingly, the amount $\delta$ by which the winding start part 13*a* protrudes in the thickness direction of the flange 15 can be suppressed to the minimum. This makes the cassette coil 1 more compact, so that it will be easier to insert the cassette coil 1 into a stator core (not shown).

In the flange 15, near an open end of the cutout portion 12, the stopper groove 18 of a rectangular shape is formed opening into the other surface (a right surface in FIG. 4) of the cutout portion 12.

Figure 8:
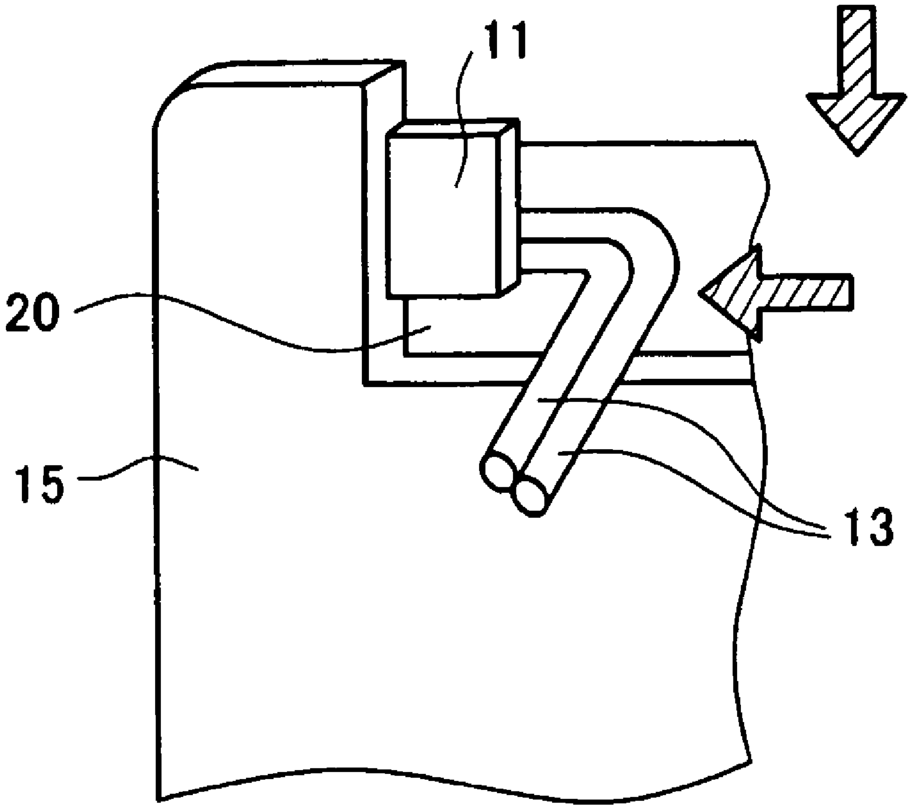
FIG. 8 is a view illustrating a manner of winding a wire around an insulator bobbin provided with an insulating wall.

Next, a process for forming the coil by winding the wire 13 around the insulator bobbin 10 provided with the insulating wall 11 will be explained. In the present embodiment, two wires 13 are simultaneously wound. First, the wires 13 are inserted from the open end of the cutout portion 12 into the clearance 20, which is positioned between the insulating wall 11 and the lower surface of the cutout portion 12, as shown in FIG. 8. In this way, owing to the clearance 20 provided between the insulating wall 11 and the lower surface of the cutout portion 12 of the insulator bobbin 10, the wires 13 can be guided into place when inserted, so that the workload in winding the wires 13 is reduced.

Second, two wires 13 are wound together around the core tube 14 along the inside the side surface of the flange 15 by one turn. Next, the wires 13 are shifted to the flange 16 side and wound around the core tube 14 by one turn so as to be adjacent to the wires 13 already wound. In this way, the wires 13 are wound around the core tube 14, while gradually shifted from the flange 15 side to the flange 16 side, forming the first layer. Next, the wires 13 are shifted from the flange 16 side to the flange 15 side, so that the second layer of the wires 13 is formed on the first layer around the core tube 14. Next, the wires 13 are shifted from the flange 15 side to the flange 16 side again, so that the third layer of wires 13 is formed on the second layer. In this way, a coil is formed which has a predetermined number of layers of the wires 13 wound around the core tube 14. Finally, at the uppermost layer, the wires 13 are shifted from the flange 16 side to the flange 15 to be wound around and guided into the stopper groove 18 of the insulator bobbin 10. In the way explained above, the wires 13 are sequentially wound around the core tube 14, thus forming the coil.

Figure 9:
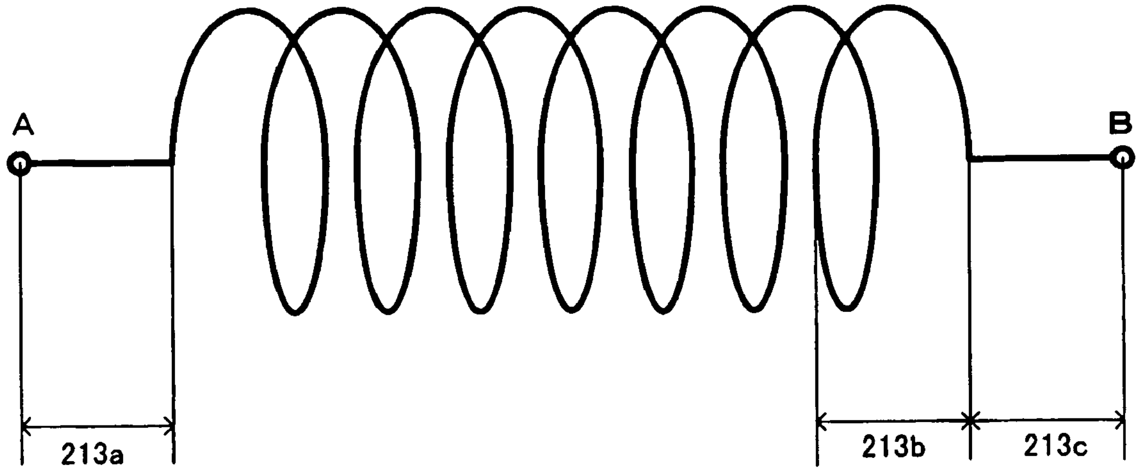
FIG. 9 is a schematic view of a typical coil.

Characteristically in the embodiment, the resin insulating wall 11 is provided at the position where the winding start part 13*a* of the wire 13 is arranged as shown in FIGS. 2 and 3. As shown in FIG. 9, since a potential difference between any two points in the coil when a current is applied becomes larger as the distance between the points becomes longer, the potential difference is the largest between both ends of the coil, A and B. Since the distance between the winding start part 13*a* and an outermost part 13*b* located on the outermost side of the coil is the longest, the potential difference therebetween becomes the largest when a high current is applied to the coil so as to generate a high voltage.

However, the resin insulating wall 11 as well as an insulating film applied to the wire 13 securely insulates between the winding start part 13*a* and the outermost part 13*b*. In addition, even when a current is applied to the coil, the potential difference in the coil between the winding start part 13*a* positioned in the clearance 20 and the part positioned in the inner side of the outermost part 13*b* is not so large. Therefore, since the insulating film provided for the wire 13 secures electric insulation, it will not be a problem even if the clearance 20 is provided between the insulating wall 11 and the lower surface of the cutout portion 12.

While there has been a demand of downsizing motors for automobiles in recent years, there is also a demand of applying a high voltage (for example, about 650V) in order to produce higher power output. To meet such demands as above, the cassette coil 1 in the present embodiment includes the resin insulating wall 11 (with its thickness of about 1 mm) in addition to the insulating film (with its thickness of about 30 μm) of each wire 13. Thus, insulation members can be arranged compactly and electric insulation can be secured between the winding start part 13*a* and the outermost part 13*b* to sustain power output of a motor.

As described above, the insulating wall 11 serving as an insulation member is provided to extend from the flange 15 of the insulator bobbin 10. Thus, the insulation member is unlikely to be detached from the insulator bobbin 10 by a gravitational acceleration under acceleration or by vibration under running of a vehicle in which the motor having the cassette coil 1 of the present invention is mounted. Even in such state, electric insulation is secured between the winding start part 13*a* and the outermost part 13*b*.

Additionally, since the insulating wall 11 is formed to have a minimum area around the winding start part 13*a* as shown in FIGS. 2 and 3, the weight of the insulator bobbin 10 is saved and consequently the weight savings of the cassette coil 1 is achieved.

The following effects are obtained by the first embodiment described above.

(1) The first embodiment exemplifies a cassette coil comprising an insulator bobbin 10 including a core tube 14 around which a wire 13 coated with an insulating film is wound, forming a coil, and a pair of plate-shaped flanges 15 and 16 provided at both ends of the core tube 14, the flange 15 including a cutout portion opening 12 in a side, wherein the cassette coil includes an insulation wall 11 between a winding start part 13*a* which is one end of the coil of the wire and an outermost wire part 13*b* located on the outermost side of the coil of the wire and close to the flange 15. Accordingly, electric insulation is secured owing to the insulation wall 11 as well as the insulating film covering the wires. Therefore, insulation is secured properly between the winding start part 13*a* of the wires 13 and the outermost part 13*b* of the coil, where a potential difference becomes the largest when a current is applied to the coil, to prevent a dielectric breakdown.

(2) According to the first embodiment, in the cassette coil described in the above (1), the insulating wall 11 is provided to extend from a part of the flange 15. Accordingly, in addition to the effect in the above (1), there also is obtained an effect that, since the insulating wall 11 is provided for the insulator bobbin 10 beforehand, insulation is secured between the winding start part 13*a* of the wires 13 and the outermost part 13*b* of the coil by merely winding the wires 13 to form the coil. Therefore, a workload for producing cassette coils is reduced, so that productivity is increased.

(3) This embodiment exemplifies a rotating electrical machine provided with a cassette coil comprising an insulator bobbin 10 including a core tube 14 around which a wire 13 coated with an insulating film is wound, forming a coil, and a pair of plate-shaped flanges 15 and 16 provided at both ends of the core tube 14, the flange 15 including a cutout portion 12 opening in a side, wherein the rotating electrical machine includes one of the cassette coils set forth in the above (1) or (2). Accordingly, there is attained an effect that electric insulation is secured owing to the insulating wall 11 as well as to the insulating film covering the wires 13. Therefore, insulation is secured properly between the winding start part 13*a* of the wires 13 and the outermost part 13*b* of the coil, where a potential difference becomes the largest when a current is applied to the coil, to prevent a dielectric breakdown. In addition, since the insulating wall 11 is provided for the insulator bobbin 10 beforehand, insulation is secured between the winding start part 13*a* of the wires 13 and the outermost part 13*b* of the coil by merely winding the wires 13 to form the coil. Therefore, a workload for producing cassette coils is reduced, so that productivity is increased.

Second Embodiment

Figure 10:
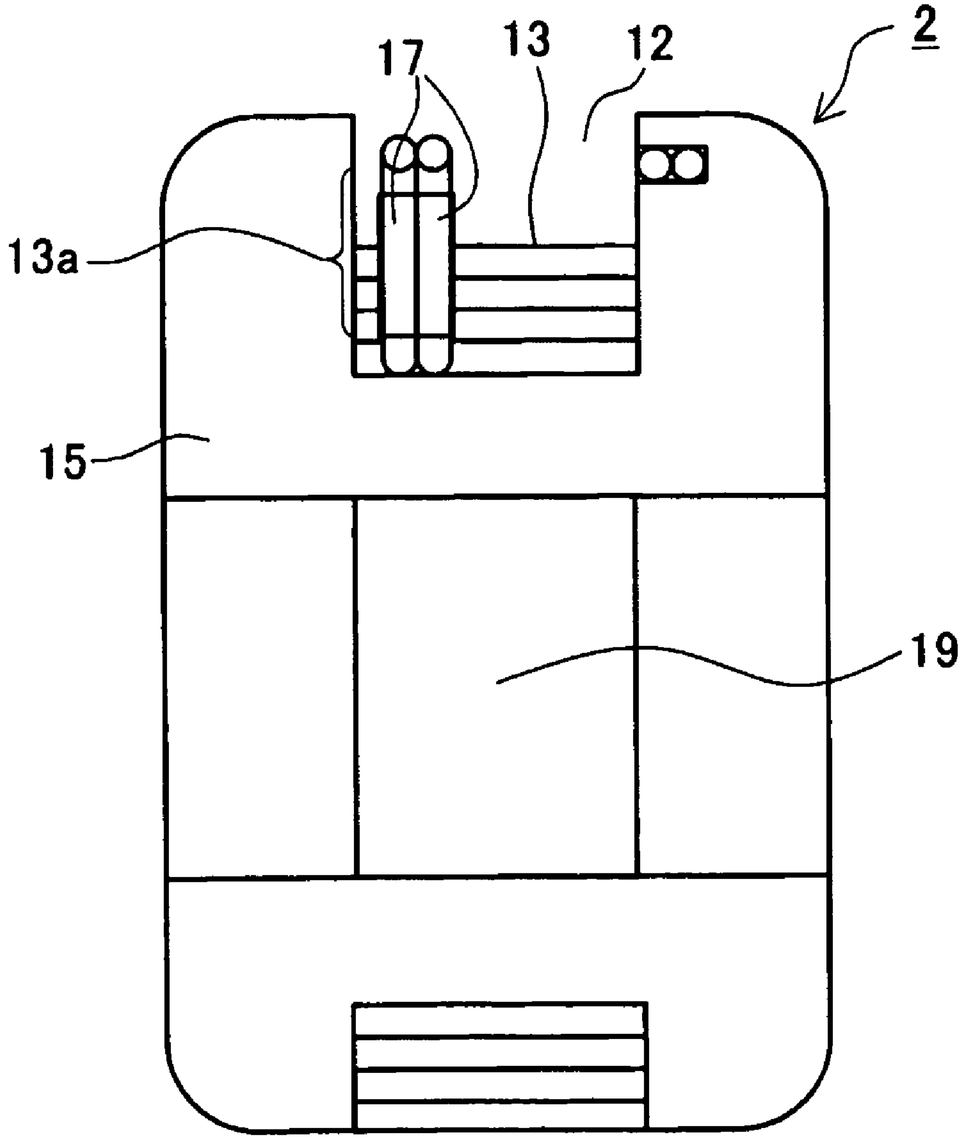
FIG. 10 is a front view of the cassette coil of the second embodiment.
Figure 11:
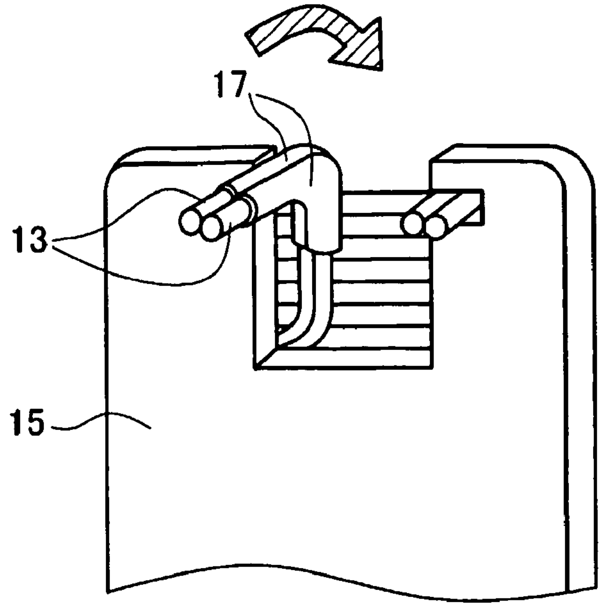
FIG. 11 is a view showing a manner of attaching an insulating tube.
Figure 12:
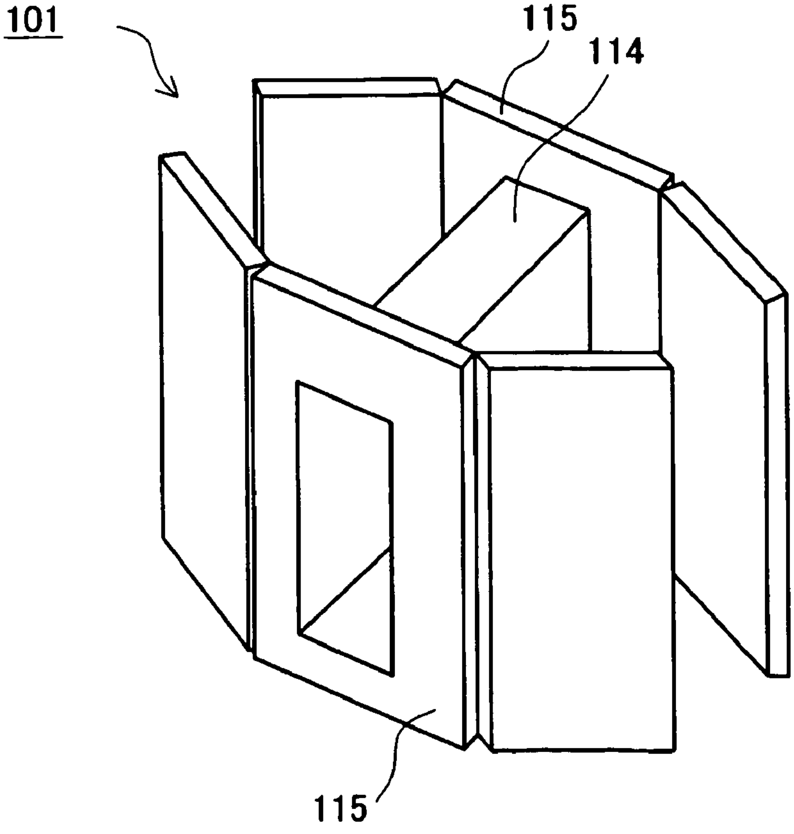
FIG. 12 is a perspective view of an insulator bobbin disclosed in Unexamined Japanese Patent Publication No. 11 (1999)-122855.
Figure 13:
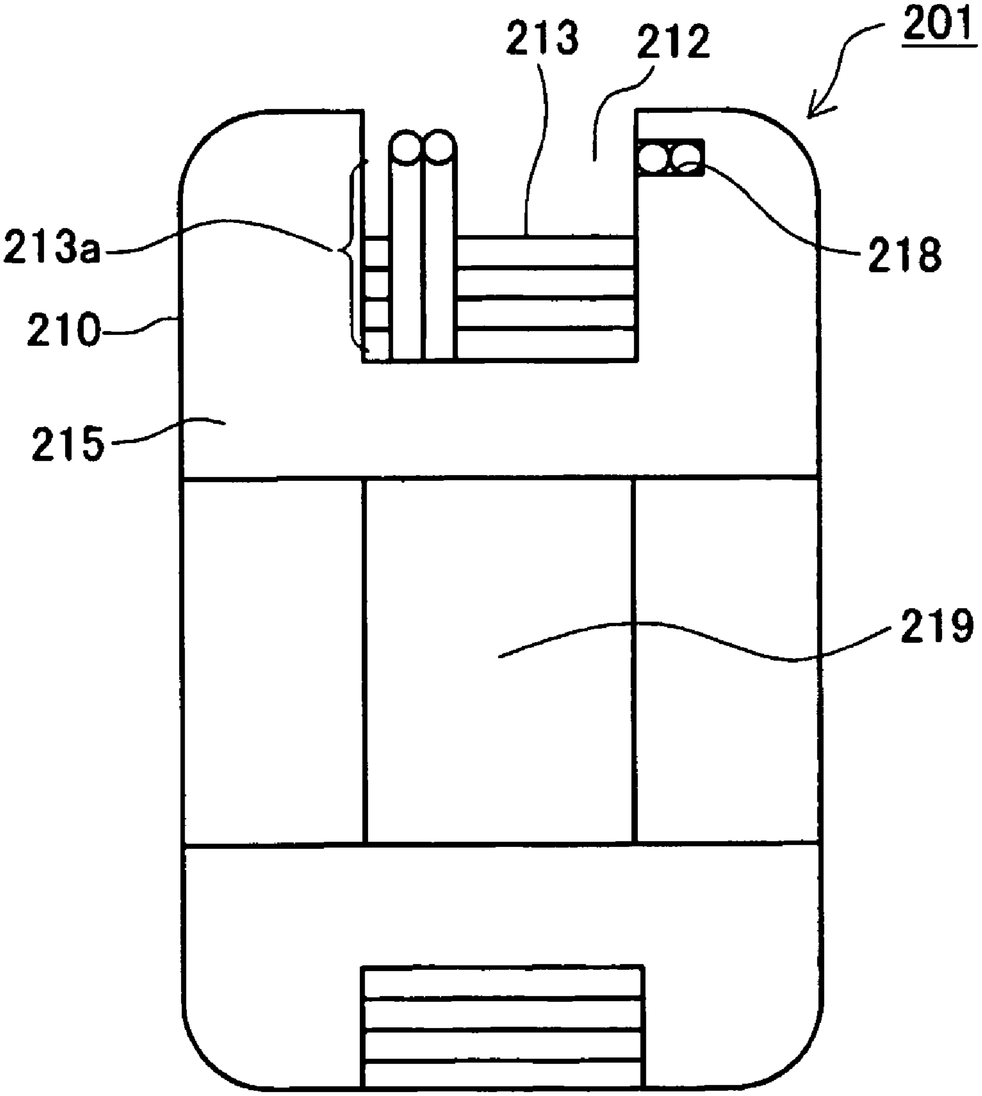
FIG. 13 is a front view of a conventional cassette coil.
Figure 14:
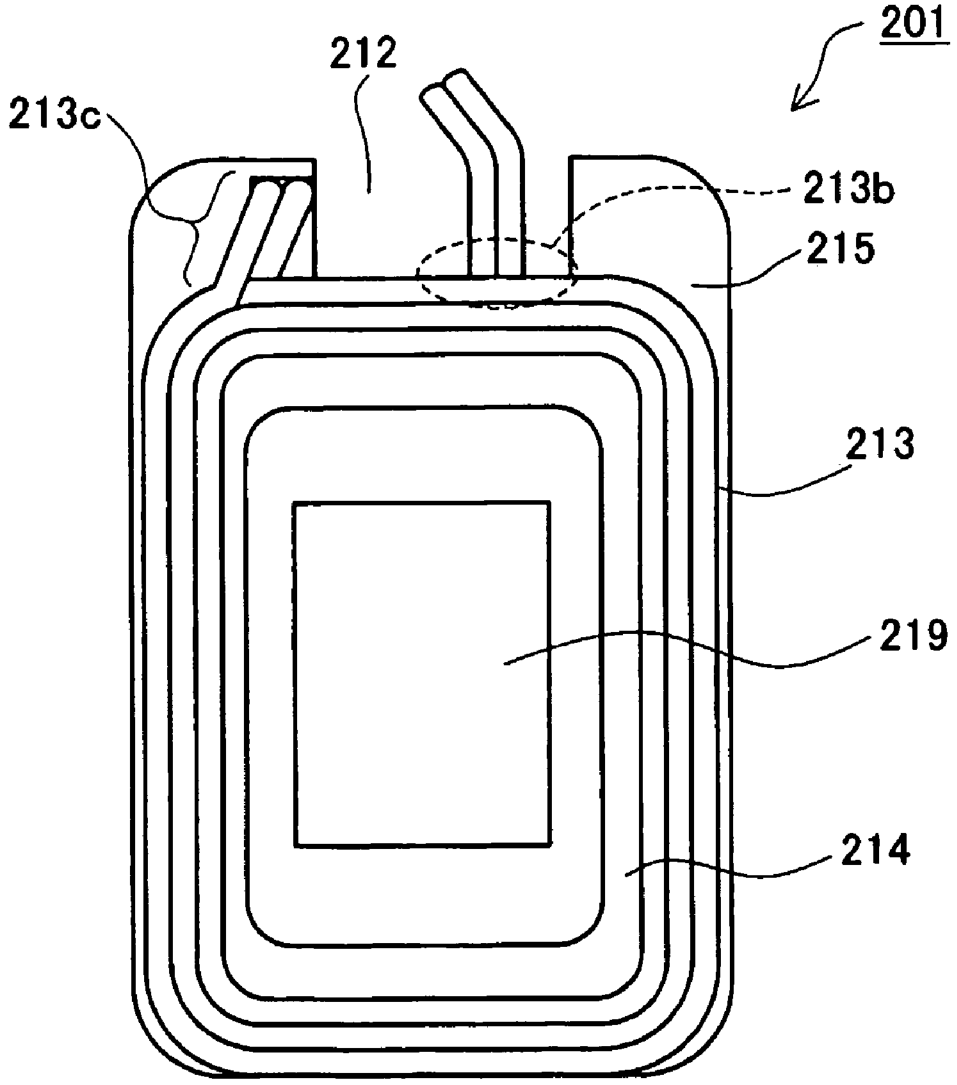
FIG. 14 is a backside perspective view of the conventional cassette coil.

Next, a second embodiment will be set forth. FIG. 10 is a front view of a cassette coil 2 of the second embodiment. As FIG. 10 illustrates, in the second embodiment, an insulating tube 17 covering the winding start part 13*a* is used as an insulation member. Other parts or elements that are in common with those in the first embodiment will not be described below.

In the cassette coil 2 of the second embodiment having the above construction, the insulating tube 17 is attached to each wire 13 from the uncoiled end of each wire 13 to cover the winding start part 13*a*. This insulating tube 17 is thin and lightweight, enabling weight savings of the cassette coil and securing electric insulation between the winding start part 13*a* and the outermost part 13*b*. Incidentally, use of a heat shrinkable tube for the insulating tube 17 makes it easier to attach the tube and improve the productivity of cassette coils 2.

The following effects are obtained by the second embodiment described above.

(1) The second embodiment exemplifies a cassette coil comprising an insulator bobbin 10 including a core tube 14 around which a wire 13 coated with an insulating film is wound, forming a coil, and a pair of plate-shaped flanges 15 and 16 provided at both ends of the core tube 14, the flange 15 including a cutout portion opening 12 in a side, wherein the cassette coil includes an insulation tube 17 between a winding start part 13*a* which is one end of the coil of the wire and an outermost wire part 13*b* located on the outermost side of the coil of the wire and close to the flange 15. Accordingly, electric insulation is secured owing to the insulation tube 17 as well as to the insulating film covering the wires 13. Therefore, insulation is secured properly between the winding start part 13*a* of the wires 13 and the outermost part 13*b* of the coil, where a potential difference becomes the largest when a current is applied to the coil, to prevent a dielectric breakdown.

(2) According to the second embodiment, in the cassette coil described in the above (1), the insulating tube 17 covers the winding start part 13*a* of the wire 13. Accordingly, in addition to the effect described in the above (1), there is also attained an effect that, insulation is secured owing to the lightweight insulation tube 17 covering the winding start part 13*a* of the wires 13. Therefore, weight increase of a cassette coil can be suppressed.

(3) The second embodiment exemplifies a rotating electrical machine provided with a cassette coil comprising an insulator bobbin 10 including a core tube 14 around which a wire 13 coated with an insulating film is wound, forming a coil, and a pair of plate-shaped flanges 15 and 16 provided at both ends of the core tube 14, the flange 15 including a cutout portion 12 opening in a side, wherein the rotating electrical machine includes one of the cassette coils set forth in the above (1) or (2). Accordingly, there is attained an effect that electric insulation is secured owing to the insulating tube 17 as well as to the insulating film covering the wires 13. Therefore, an insulation is secured properly between the winding start part 13*a* of the wires 13 and the outermost part 13*b* of the coil, where a potential difference becomes the largest when a current is applied to the coil, to prevent a dielectric breakdown. Further, insulation is secured owing to the lightweight insulation tube 17 covering the winding start part 13*a* of the wire 13. Therefore, weight increase of a cassette coil can be suppressed.

It should be recognized that the invention is not necessarily limited to the particular embodiments shown herein and various changes and modifications may be made to the disclosed embodiments without departing from the scope of the invention.

The invention claimed is:

1. A cassette coil comprising an insulator bobbin including a core tube around which a wire coated with an insulating film is wound, forming a coil, and a pair of plate-shaped first and second flanges provided at both ends of the core tube, the first flange including a cutout portion opening in a side, and the cassette coil being mountable in a stator of a rotating electrical machine, wherein a winding start part and a winding end part which are ends of the coil of the wire are placed to protrude outside through the same cutout portion of the first flange, and the cassette coil includes an insulation member provided to extend from a part of the first flange into the cutout portion between a winding start part and an outermost wire part located on the outermost side of the coil of the wire and close to the first flange.

2. The cassette coil according to claim 1, wherein a clearance is provided for insertion of the winding start part between the insulation member and a lower surface of the cutout portion.

3. A cassette coil comprising an insulator bobbin including a core tube around which a wire coated with an insulating film is wound, forming a coil, and a pair of plate-shaped first and second flanges provided at both ends of the core tube, the first flange including a cutout portion opening in a side, and the cassette coil being mountable in a stator of a rotating electrical machine, wherein a winding start part and a winding end part which are ends of the coil of the wire are placed to protrude outside through the same cutout portion of the first flange, the cassette coil includes an insulation member between the winding start part and an outermost wire part located on the outermost side of the coil of the wire and close to the first flange, and the insulation member is a heat shrinkable insulating tube covering the winding start part of the wire.

4. A rotating electrical machine provided with a cassette coil comprising an insulator bobbin including a core tube around which a wire coated with an insulating film is wound, forming a coil, and a pair of plate-shaped first and second flanges provided at both ends of the core tube, the first flange including a cutout portion opening in a side, and the cassette coil being mountable in a stator of a rotating electrical machine, wherein the rotating electrical machine includes one of the cassette coils set forth in claim 1.

5. The cassette coil according to claim 2, wherein the wire includes two wires to be wound together, and the clearance includes a width allowing the insertion of winding start parts of the two wires.

6. The cassette coil according to claim 1, wherein the insulating member is an insulation wall having a smaller thickness than the first flange so that an outer surface of the insulation wall and an outer surface of the first flange provide a stepped portion.

* * * * *